Aug. 11, 1931.　　　　H. R. MOLES　　　　1,818,000
AEROFOIL OPERATING MECHANISM
Filed March 19, 1930
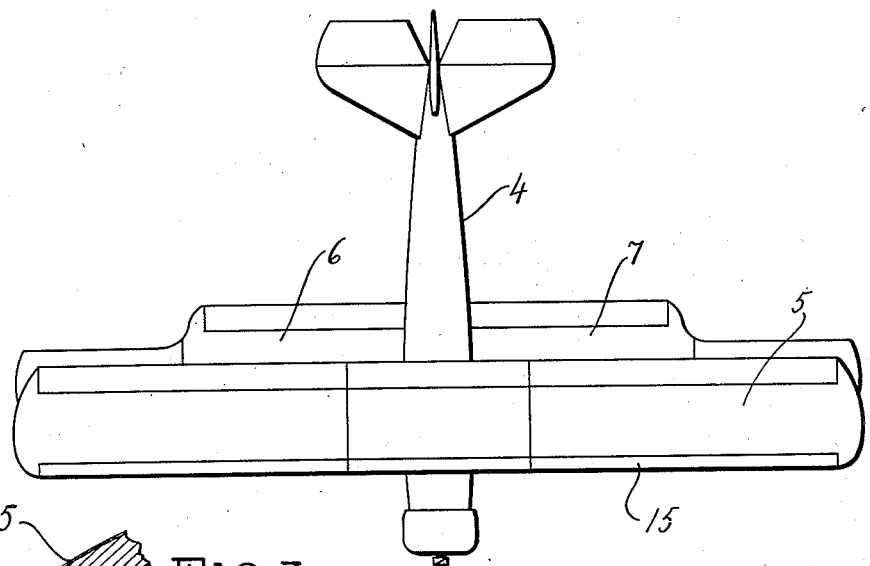
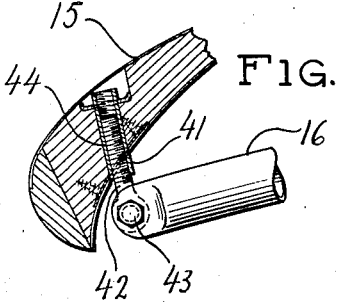
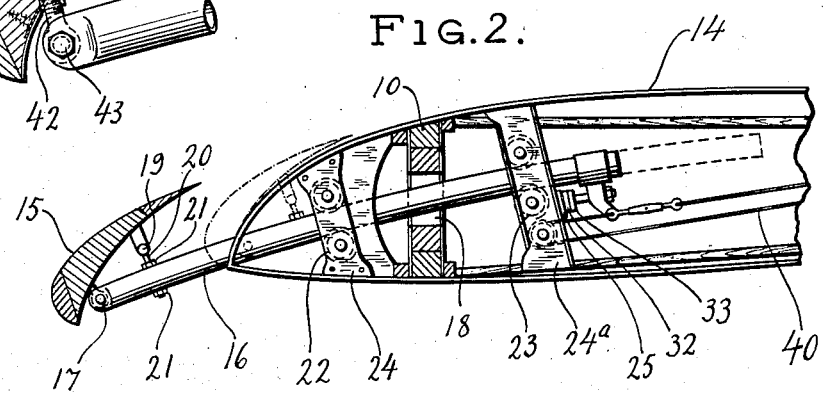
INVENTOR
HOWARD R. MOLES
BY
ATTORNEY Patented Aug. 11, 1931

1,818,000

UNITED STATES PATENT OFFICE

HOWARD R. MOLES, OF GARDEN CITY, NEW YORK, ASSIGNOR TO CURTISS AEROPLANE & MOTOR COMPANY, INC., A CORPORATION OF NEW YORK

AEROFOIL OPERATING MECHANISM

Application filed March 19, 1930. Serial No. 437,003.

This invention relates to aircraft and more especially to airplanes of the type in which means are provided for automatically opening and closing slots adjacent the nose of the wings for the purpose of increasing the minimum angle at which the airplane will stall. The invention described herein comprises improvements upon an invention disclosed in a co-pending application of Robert R. Osborn, Serial No. 349,927, filed on or about March 26, 1929.

One of the objects of this invention is to provide improved means for adjusting the height and/or angle of attack of auxiliary wings which are positioned in front of the main wings and which move forward or backward to open or close the slots.

Further objects will be apparent from a reading of the subjoined specification and claims and from a consideration of the accompanying drawings.

In order to explain the invention more clearly, one embodiment thereof is shown in said drawings, in which:

Fig. 1 is a plan view of an airplane equipped with one form of my invention;

Fig. 2 is a sectional view of one of the wings of the airplane shown in Fig. 1 shown on an enlarged scale with parts broken away; and Fig. 3 is a view similar to Fig. 2 on a still larger scale to show details of part of the adjusting mechanism.

In the drawings, I have disclosed an airplane equipped with a fuselage 4, an upper wing 5 and lower wings 6 and 7. The upper wing 5 comprises a forward wing beam 10, conventional ribs (not shown), wing covering 14, etc. Adjustably fastened to said main wing 5 and slidably movable toward and from the leading edge thereof is a wing section auxiliary wing 15. Movements of this auxiliary wing are entirely automatic and are brought about through air pressures acting upon it. Similar auxiliary wings may also be provided for the wings 6 and 7 if desired.

The means for supporting the auxiliary wing 15 in front of the main wing 14 comprises a plurality of arcuate support arms 16, each of which at its rearward end is let through the forward wing beam 10, suitable openings 18 being provided in said beam for this purpose. Each of the arcuate support arms 16 is adjustably hinged at its forward end as at 17 to the auxiliary wing.

In order that the angle of incidence of the auxiliary wing may be adjusted, the hinge point 17 of each support arm is located adjacent to the leading edge of the auxiliary wing. Said auxiliary wing at a point behind and above its leading edge has hinged thereto as at 19 a plurality of link bolts 20, one for each support arm. The link bolts 20 penetrate the support arms and have mounted thereon on each side of said arms nuts 21—21 by means of which the link bolts are adjusted and locked. By varying the effective length of the link bolts 20, the angular position of the auxiliary wing 15 with respect to the main wing may be adjusted as desired.

The forward end of the auxiliary wing is also adjustable relative to the arcuate support arm 16 so that it is possible to adjust not only the relative angle of incidence of the auxiliary wing 15, but also the height of said auxiliary wing relative to the main wing 14. As indicated clearly in Fig. 3 the forward edge of the auxiliary wing has securely fastened therein a plurality of hollow tubes such as the tube 41, one of these tubes being provided for each arcuate support arm 16. Each of these tubes is provided with a rectangular head and the whole tube fits snugly within an opening in the auxiliary wing prepared therefor so that it is secure against both longitudinal and rotary movement. The pivotal fastening at 17 is not connected directly to the auxiliary wing 15 but a bolt 42 is provided and is directly fastened to the arm 16 at 17 by a pin 43. This bolt is externally screw threaded at 44 and may be screwed into internal screw threads provided within the tube 41. After the bolt 42 has been adjusted to the desired point within the tube 41, the pin 43 may be inserted through the arcuate arm 16 and the bolt to lock securely the height of the forward portion of the auxiliary wing with respect to the arcuate arm 16 and therefore with respect to the wing 14. Thereafter, adjustment may be made by the bolt 20 to bring the auxiliary wing to the desired angle relative to the main wing.

The support arms 16 are held for sliding movement as well as against axial play by means of two sets of ball bearing rollers designated respectively 22 and 23. Both sets of these rollers are preferably fixed, the fittings 24 and 24ª being securely fastened in any suitable manner to the forward wing beam 10. Shock absorbers 32 are provided at the inner extremities of the rear extensions 25 of the several fittings 24ª. The support arms 16 carry at their inner ends abutment fittings 33, portions of which bear directly on the shock absorbers 32 in the extended position of the auxiliary wing. An endless cable 40 has been provided for maintaining the auxiliary wing at all times in parallelism with the leading edge of the main wing and operates in a manner similar to that described in said co-pending application of Robert R. Osborn.

It is thought that the operation of my novel adjusting means will be apparent from the above description. The pin 43 is first removed. Thereafter, the bolt 42 is screwed into or out of the tube 41 until the lower edge of the auxiliary wing is at its desired relative height. Thereafter, the pin 43 is reinserted to lock said adjustment of the nose of the auxiliary wing and one of the nuts 21—21 is loosened while the other is tightened in order to adjust the auxiliary wing to the desired angle of incidence.

It is to be understood that the above described embodiment of the invention is for the purpose of illustration only and various changes may be made therein without departing from the spirit and scope of the invention.

I claim as my invention:

1. In an airplane, a main wing, an auxiliary wing positioned in front thereof and adapted to form a combined aerofoil with said main wing, an arcuate arm mounted for sliding movement within said main wing, and means for adjustably supporting said auxiliary wing upon said arcuate arm at two spaced points.

2. In an airplane, a main wing, an auxiliary wing, means for slidably supporting said auxiliary wing upon said main wing for movement away from and toward said main wing whereby a slot may be opened and closed adjacent to the leading edge of the combined aerofoil, means for moving the nose of said auxiliary wing both relative to the main wing and also relative to the supporting means to vary the relative height thereof with reference to the main wing and to said supporting means, and separate means for varying the angle of the auxiliary wing with respect to the main wing and to said supporting means.

3. In an airplane, a main wing, an auxiliary wing, means for slidably supporting said auxiliary wing upon said main wing for movement away from and toward said main wing whereby a slot may be opened and closed adjacent to the leading edge of the combined aerofoil, and means for moving the nose of said auxiliary wing both relative to the main wing and also to the supporting means to vary the relative height thereof with reference to the main wing and to said supporting means.

4. In an airplane, a main wing, an auxiliary wing positioned in front thereof and adapted to form a combined aerofoil with said main wing, an arcuate arm mounted for sliding movement within said main wing, means for adjustably supporting said auxiliary wing upon said arcuate arm at a point adjacent to the forward end of said arm, and separate means for adjustably supporting said auxiliary wing upon said arcuate arm at a point spaced from said first named point.

In testimony whereof I hereunto affix my signature.

HOWARD R. MOLES.